J. N. LEWIS.
APPARATUS FOR EXTRACTING METAL FROM ORES.
APPLICATION FILED OCT. 28, 1916. RENEWED MAR. 8, 1918.
1,265,459.
Patented May 7, 1918.
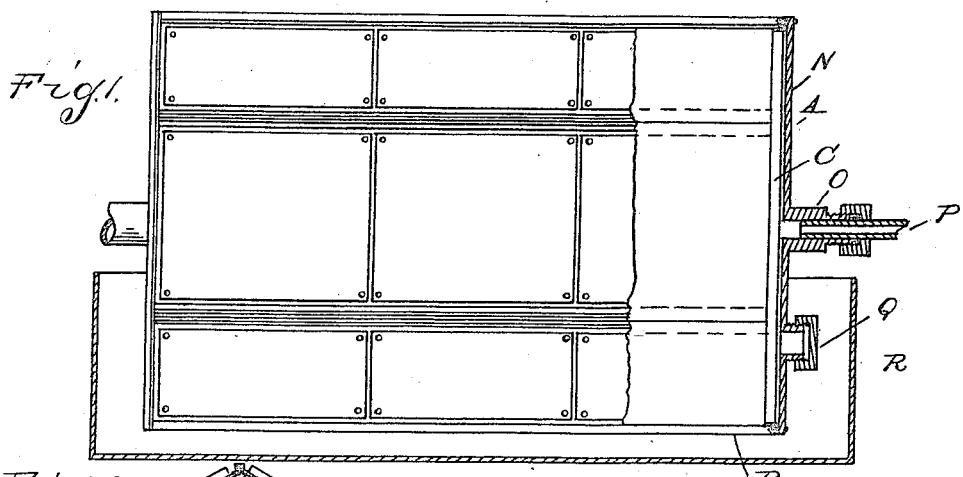
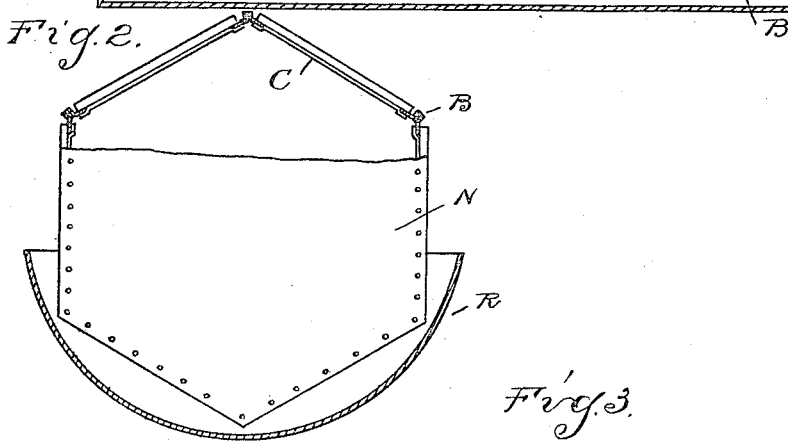
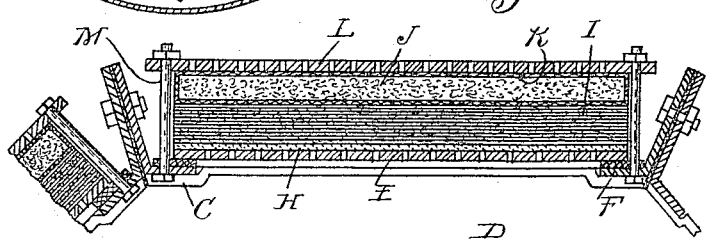
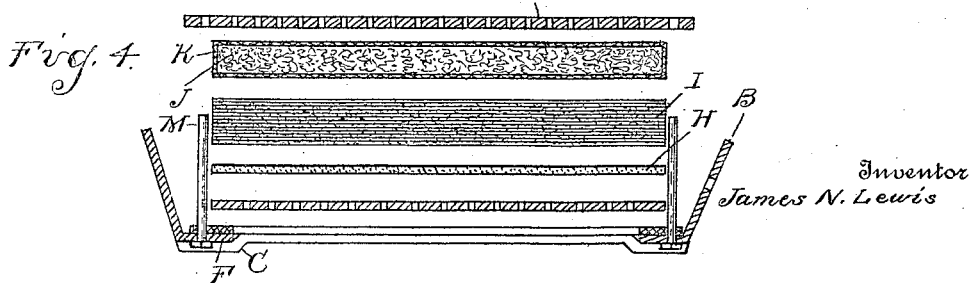
Inventor
James N. Lewis
By Whittemore Hulbert & Whittemore
Attorneys

UNITED STATES PATENT OFFICE.

JAMES N. LEWIS, OF DETROIT, MICHIGAN, ASSIGNOR TO WILLIAM L. WILSON, TRUSTEE, OF DETROIT, MICHIGAN.

APPARATUS FOR EXTRACTING METAL FROM ORES.

1,265,459.

Specification of Letters Patent. Patented May 7, 1918.

Application filed October 28, 1916, Serial No. 128,186. Renewed March 8, 1918. Serial No. 221,326.

*To all whom it may concern:*

Be it known that I, JAMES N. LEWIS, a citizen of the United States of America, residing at Detroit, in the county of Wayne and State of Michigan, have invented certain new and useful Improvements in Apparatus for Extracting Metal from Ores, of which the following is a specification, reference being had therein to the accompanying drawings.

The invention relates to the art of extracting metal from ores and has more particular reference to the cyanid process. It is the object of the invention to facilitate extraction, to simplify the apparatus required for treatment, and to diminish the time required for treatment, and with these objects in view the invention comprises, first, the method and, second, the apparatus as hereinafter set forth.

In the drawings:

Figure 1 is a longitudinal section partly in elevation through the apparatus;

Fig. 2 is a cross section thereof;

Fig. 3 is an enlarged section showing one of the cells; and

Fig. 4 is a similar view showing the manner of removing the precipitating material.

My inprovement relates generally to the known cyanid process of extracting gold, silver and other precious metals from the ores containing the same, which comprises, first, the agitation of the ore in the cyanid solution; second, the filtering of the solution to separate the pregnant liquor from the ore and slime; and third, the precipitation of the metal content by a suitable agent, such as zinc. One of the features of my improved process is the intimate association of the precipitating step with the filtration so that the clarified liquor passing through the filter is immediately brought into intimate contact with the precipitating agent. Another feature is the means by which the filter and precipitating material thus intimately associated are readily separated for the removal of the latter and the extraction of the precious metals therefrom.

The apparatus for carrying out my improved process comprises essentially a cell or container for holding the filtrous material and precipitating material in juxtaposition. A series of such cells are preferably arranged to form the wall or a portion of the wall of a container, in which the charge of the metalliferous ore and extracting solution is agitated, while the percolating liquid passes successively through the filter and extracting material and is then collected in an outer vessel or container. This liquid may be repassed through the apparatus as many times as required to obtain the desired results. When the precipitating material has received a sufficient load of the metal extracted from the ore it may be removed from the cell and replaced by fresh precipitating material.

In its preferred form my apparatus comprises a skeleton frame or cage A formed of longitudinally-extending bars B and cross-bars C dividing the area into a series of openings or cells. In each one of these cells is arranged a combined filtering and precipitating unit D, which as shown is constructed as follows: E is a perforated metal plate adapted to rest against flanges F on the longitudinal and transverse bars, a suitable gasket packing being interposed therebetween to make a liquid and air-tight joint. H is a layer of canvass cloth or other suitable material arranged against the perforated plate E adapted to receive and hold any particles of the metal carried by but not dissolved in the solution. I is a suitable filtrous material arranged adjacent to the layer H. J is the precipitating material such as zinc dust or shavings, preferably placed inside of a fabric bag K. L is a second perforated plate outside of the bag K and M are clamping bolts for securing the parts together and attaching the same to the cage.

In assembling the apparatus the units D are placed in the different cells of the cage and clamped in position as described, after which heads N are clamped or otherwise secured to the opposite ends of the cage to complete a cylindrical receptacle. These heads are provided with trunnions O journaled in suitable bearings, not shown, one of said trunnions being hollow and having swiveled therein a conduit P for the admission of compressed air or additional liquid.

One of the heads is also provided with a detachable cover Q which when removed permits of filling or emptying the container. Beneath the cylinder and extending around the sides thereof is a trough R for receiving and holding the liquid which passes through the cells, and suitable means (not shown) is provided for rotating the cylinder upon its trunnions.

In operation, the ore together with a suitable quantity of the cyanid solution is introduced into the container through the removable cap Q, and the cylinder is then rotated to cause a thorough commingling and agitation of its contents. At the same time compressed air is admitted through the conduit P for supplying the necessary oxygen for carrying out the chemical reaction. During the time in which this treatment is carried on the liquid which becomes pregnant with the dissolved metals will pass through the filtrous material and then through the bags K containing the precipitating material. The filtration removes the ore and slime, and the clarified liquid in passing through the interstices of the zinc shavings or other precipitating material will come into intimate contact with the surfaces thereof and will deposit the dissolved metal. If there are any particles of the metal separated from the ore during the agitation but not completely dissolved by the liquid these will be caught by the canvas cloth layer H before the liquid passes into the filter.

By the usual test of the liquid, the operator may determine when it is desirable to renew the precipitating material, and at such time the cage or cylinder is disengaged from its bearings and replaced by another cage. The removed cage can be readily transported to the melting room or other place of safety where it is disassembled, the cloth layers H and the bags K containing the precipitating material being removed. The cloth is given a mercury bath or is burned to free the metal held in the meshes thereof, while the precipitating material is suitably treated to extract the deposited metals therefrom.

With my improved process and apparatus economy is effected both in the time of treatment, the quantity of extracting solution required and the space necessary for the installation of the apparatus. Furthermore, there is a safety element due to the fact that the extracted metal is inaccessible except by the disassembling of the cage, and by removing the cage as a unit to a place of safety there will be no danger of the unauthorized removal of any of the contained metal.

What I claim as my invention is:

1. An apparatus for extracting metals from ores, comprising a receptacle, and a combined filtering and precipitating unit comprising separable filtering and precipitating materials, said unit forming a portion of the wall of said receptacle.

2. An apparatus for extracting metals from ores, comprising a receptacle for holding the ore and solvent solution, means for agitating the same, a combined filtering and precipitating unit comprising separable filtering and precipitating materials, said unit constituting a portion of the wall of said receptacle, and means for receiving the liquid passing therethrough.

3. An apparatus for extracting metals from ores, comprising a receptacle adapted to receive and agitate a charge of ore and solvent liquid, a combined filtering and precipitating unit forming a portion of the wall of said receptacle, said unit comprising filtrous material, a porous container for the precipitating material arranged in proximity thereto, and means for separably clamping said material to the wall of said receptacle.

4. An apparatus for extracting metals from ores, comprising a receptacle or container for receiving a charge of ore and the solvent liquid, said container having a series of openings in the wall thereof, and combined filtering and precipitating units removably secured to fill said openings, each unit comprising an inner layer of filtering material and an outer separable layer of precipitating material.

5. An apparatus for extracting metals from ores, comprising a container or receptacle for receiving a charge of ore from the solvent liquid, and a combined filtering and precipitating unit forming a removable portion of the wall of said container, said unit consisting of an inner perforated guard or screen, metal intercepting and holding material adjacent thereto, filtrous material adjacent to said intercepting material and precipitating material adjacent to said filtrous material.

6. In an apparatus for extracting metals from ores, a container or receptacle for receiving a charge of ore and the solvent liquid, the walls of said receptacle being formed of a plurality of separable units, each unit comprising an inner perforated guard or screen, free metal intercepting and holding material adjacent thereto, filtrous material adjacent to said intercepting material and precipitating material adjacent to said filtrous material, and means for clamping said sections in position.

7. In an apparatus for extracting metals from ores, a combined filtering and precipitating unit comprising filtrous material, a porous container for the precipitating material arranged in proximity thereto, and means for separably clamping said porous container and filtrous material against each other.

8. In an apparatus for extracting metals from ores, a container or receptacle for receiving a charge of ore and the solvent liquid, the walls of said container being formed of a plurality of separable units, each unit comprising filtering material and precipitating material held in separable proximity.

In testimony whereof I affix my signature.

JAMES N. LEWIS.